Oct. 29, 1957 U. B. THOMAS, JR., ET AL 2,811,655
STABLE LIQUID ELECTRODES FOR PIEZO-ELECTRIC CRYSTALS
Filed Aug. 4, 1953

INVENTORS: U.B. THOMAS, JR.
E. A. WOOD
BY
H. O. Wright
ATTORNEY

United States Patent Office 2,811,655

Patented Oct. 29, 1957

2,811,655

STABLE LIQUID ELECTRODES FOR PIEZO-ELECTRIC CRYSTALS

Upton B. Thomas, Jr., and Elizabeth A. Wood, Summit, N. J., assignors to Bell Telephone Laboratories, Incorporated, New York, N. Y., a corporation of New York Application August 4, 1953, Serial No. 372,214

2 Claims. (Cl. 310—8.9)

Figure 1:
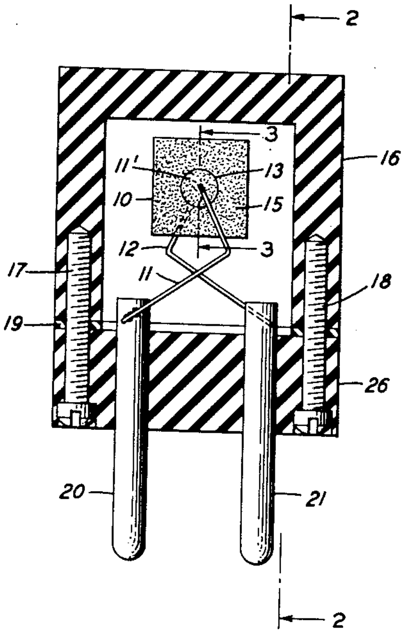

This invention relates in general to electrode contacts and, more particularly, to liquid electrode contacts as applied to piezoelectric or ferroelectric crystal elements.

The hysteresis property of ferroelectric crystals has recently assumed considerable importance as applied to memory circuits and calculating devices. This property depends on the rapidity and regularity with which small electrically polarized units or "domains" shift within the crystal structure when an electrical field is applied. It has been found that when the electrical field is applied through conventional metallic electrodes substantial distortions are introduced into the hysteresis pattern, and the response times for applied fields are objectionally long. Possible explanations for this are mechanical clamping of the crystal surface by the metal electrode, and the presence of a layer of lower conductivity material between the electrode and the crystal. The use of liquid electrodes for this purpose has greatly reduced or eliminated such distortion by elementary clamping, and making possible more direct contact between the electrode and the crystal surface.

Certain of the disadvantages inherent in prior art liquid electrodes, such as rapid evaporation and a tendency to etch the crystal surface by chemical action, have been largely overcome by the use of drops of hygroscopic electrolyte, as disclosed in the sole application Serial No. 372,288, filed on even date herewith by applicant Elizabeth A. Wood, now U. S. Patent No. 2,785,322, issued March 12, 1957. The pertinent parts of said sole application are incorporated by reference in the present joint application.

An additional disadvantage inherent in liquid electrodes of the types previously used is that they do not have sufficient mechanical stability for certain practical applications. Furthermore, the electrolyte tends to creep on the surface of the crystal, change its shape, and even, as a result of slow creep around the crystal edges, to short-circuit the crystal.

Accordingly, it is the general object of this invention to substantially eleminate in crystal structures employing liquid electrodes, electrical, chemical and mechanical instability.

More specific objects of the invention are to stabilize the mechanical structure of liquid electrodes, and to prevent creeping of the electrolyte.

These objects are attained in a structure which comprises a pair of fine wire headed contacts, or terminal wires, separated by drops of hygroscopic electrolye from opposing major surfaces of the crystal element with which they are associated in electrical contacting relation. The assemblage, including the drops of electrolyte and contacting wires, is mechanically secured to the surface of the crystal element by means of a durable enclosing film which is substantially insoluble in the hygroscopic electrolyte, and substantially impervious thereto.

For the purposes of the present disclosure and claims, "hygroscopic salt" means any salt which will absorb sufficient water from the atmosphere in which the electrode unit is assembled to form a conducting solution. Any hygroscopic salt is deemed suitable for the uses of the present invention whose solution does not chemically attack either the crystal, or associated metal terminal, and which has sufficient surface tension to substantially inhibit it from creeping beneath the coating or covering film and displacing this film.

The enclosing film may be a polymer in suitable solvent which, when applied as a spray, produces a film which dries without cracking and which is sufficiently impervious to the electrolyte not to be rendered itself conducting. Film forming polymers suitable for the purposes of the present invention are polymerized acrylic ester dissolved in toluene and polystyrene dissolved in toluene.

Figure 2:
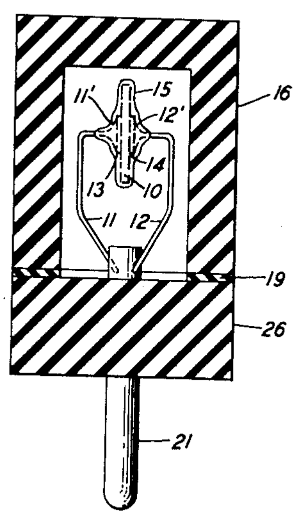

The details of the present invention may be more fully understood by reference to the description hereinafter of a typical embodiment, of which Fig. 1 shows a front section of a complete unit; Fig. 2 shows a side section along the line 2—2 of the unit of Fig. 1; and Fig. 3 shows a central section of the crystal assembly of Fig. 1 along the line 3—3 of Fig. 1.

Figure 3:
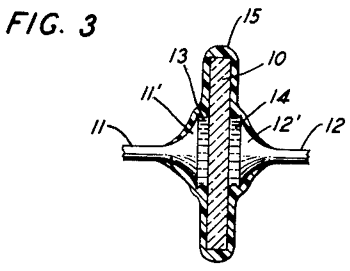

Figs. 1, 2 and 3, taken together, show in detail an assembly in accordance with the present invention including a crystal element 10 having attached to its opposing surfaces a pair of hygroscopic liquid electrodes, 13, 14, enclosed in a polymer film 15. The crystal may be any conventional piezoelectric or ferroelectric element, and may comprise either a ceramic or single crystal. Assume, for example, that the element 10 comprises a ferroelectric wafer 1.5 millimeters square and .05 millimeter thick, cut from a barium titanate single crystal. The aforesaid wafer 10 is supported between a pair of platinum terminal wires 11 and 12, having respective heads 11′ and 12′, which make electrical (but not mechanical) contact with its opposing major faces through liquid electrodes comprising drops of lithium chloride solution 13 and 14. Each of these liquid electrodes covers an area of the central portion of one of the two opposed major wafer faces, as shown, without creeping over the edges.

Superposed on the crystal assemblage including the hygroscopic drops 13, and 14, is a coating film 15. This film performs the two-fold function of preventing the slow spread of the hygroscopic solution over the face of the crystal element 10, and of mechanically restraining the crystal element or wafer 10 so that in case of violent mechanical shock to the unit, the wafer will not escape from between the heads 11′ and 12′. Without the enclosing film 15, only the surface tension of the hygroscopic drops 13 and 14 would hold the wafer 10 in its proper position.

As stated hereinbefore, the film material comprises a polymer dissolved in suitable solvent, such that it will lend itself to spray application in a manner well known in the present-day art. In typical embodiment, a suitable film-producing material is a solution of a polymerized acrylic ester dissolved in toluene, or alternatively, polystyrene dissolved in toluene.

The polymer material to be utilized in the film is dissolved in sufficient solvent for convenience in application. It is sprayed on the crystal unit, including the hygroscopic drops 13 and 14 and the headed terminal wires 11 and 12, assembled as shown in Figs. 1 and 2. During the coating process, the surface of crystal element 10 should be substantially dry beyond the periphery of the hygroscopic drops 13 and 14, which should have sufficient surface tension to keep them from creeping to the crystal edges. Moreover, the spray should be applied in the same atmosphere with which the hygroscopic electrolyte has established equilibrium. The excess solvent is then allowed to evaporate, leaving the film material thinly coating all parts of the unit, or at least, those portions surrounding and adjacent to the hygroscopic drops 13 and 14 and their associated terminal wire heads 11' and 12'. The film 15 should be substantially impervious to the hygroscopic solution on whose exposed surface it lies, forming mechanical (but not electrical) connections between the metal heads 11' and 12' of the respective terminal wires 11 and 12 and the crystal surfaces, to both of which it adheres closely.

Suitable solutions for this purpose are 15 parts by weight of either polystyrene or polymerized acrylic ester dissolved in 85 parts of toluene. For convenience, the latter may be obtained from Rohm and Haas as "Acryloid B 72," which is a 40 percent solution of the ester in toluene, suitably diluted.

For increased mechanical stability and as an added protection against extreme changes in the humidity of the ambient atmosphere, the assembled unit including the crystal 10, the liquid electrodes 13 and 14, the contacting heads 11' and 12' of terminal wires 11 and 12, and the enclosing film 15, may be enclosed in a hollow, substantially moisture-proof, two-piece, hard rubber or plastic housing 16, 26, which is held together by means of screws 17 and 18, the joint between housing portions 16 and 26 being sealed by a gasket 19. The wires 11 and 12 are secured to separate binding posts 20 and 21, embedded in housing portion 26, so that the crystal assemblage may be readily plugged into an external circuit.

The operational characteristics of units of the type herein described were found to be unchanged after dropping on the floor and other rough treatment. Intermittent tests for extended periods in an air-conditioned room indicated that the polarizations of the units remained constant, showing that the areas covered by the electrodes did not change substantially over the test period. Moreover, the forms of the rectangular hysteresis loops which characterize these crystals, and their pulsing times, were found to be unchanged after application of the liquid electrodes and tests of the types described, in distinct contrast to the performances of crystal units employing conventional metallic electrodes.

Practice of the disclosed invention is not to be construed as limited to the particular structures or materials herein described by way of illustration, as numerous and varied other structures and/or materials clearly within the spirit and scope of the present invention will readily occur to those skilled in the art.

What is claimed is:

1. The combination which comprises a piezoelectric crystal wafer formed of water-insoluble material and having two oppositely disposed major faces, a metallic electrode juxtaposed with a portion of each of said faces and out of contact therewith, a conducting wire electrically fixed to each of said electrodes, a drop of hygroscopic liquid electrolyte disposed between each of said electrodes and the wafer face with which it is juxtaposed in electrical contact both with said wafer face and with said electrode and substantially filling the intervening space, and means for supporting said wafer, said electrodes and said conducting wires in mechanically stable fashion in their spatial dispositions, for confining said liquid drops to the intervening spaces provided for them, and for preventing evaporation of said drops, said means consisting of film of a tough, polymerized, water-insoluble resin that is impervious to said electrolyte, surrounding said wafer and said electrodes.

2. The combination which comprises a piezoelectric crystal wafer formed of water-insoluble material and having two oppositely disposed major faces, a metallic electrode juxtaposed with a portion of each of said faces and out of contact therewith, a conducting wire electrically fixed to each of said electrodes, a drop of hygroscopic liquid electrolyte disposed between each of said electrodes and the wafer face with which it is juxtaposed in electrical contact both with said wafer face and with said electrode and substantially filling the intervening space, and means for supporting said wafer, said electrodes and said conducting wires in mechanically stable fashion in their spatial dispositions, for confining said liquid drops to the intervening spaces provided for them, and for preventing evaporation of said drops, said means consisting of film of a tough, polymerized, water-insoluble resin that is impervious to said electrolyte, surrounding said wafer and said electrodes, said film providing two pockets for containing said two drops, respectively, each of said pockets being defined by one of said electrodes, by a portion of the wafer face with which it is juxtaposed, and by a portion of the inner surface of said film.

References Cited in the file of this patent

UNITED STATES PATENTS

| | | |
|---|---|---|
| 2,228,601 | Hawk | June 14, 1941 |
| 2,266,333 | Ream | Dec. 16, 1941 |
| 2,386,279 | Tibbetts | Oct. 9, 1945 |
| 2,386,692 | Kuenstler | Oct. 9, 1945 |